United States Patent
Mullender et al.

(10) Patent No.: US 8,390,866 B2
(45) Date of Patent: Mar. 5, 2013

(54) COMPUTER-CONNECTABLE PORTABLE MEMORY DEVICE

(75) Inventors: Matthijs F. Mullender, Venlo (NL); Robert J. Audenaerde, Utrecht (NL); Waldo Ruiterman, Venlo (NL)

(73) Assignee: OCE-Technologies B.V., Venlo (NL)

( * ) Notice: Subject to any disclaimer, the term of this patent is extended or adjusted under 35 U.S.C. 154(b) by 878 days.

(21) Appl. No.: 12/073,905

(22) Filed: Mar. 11, 2008

(65) Prior Publication Data

US 2008/0225338 A1    Sep. 18, 2008

(30) Foreign Application Priority Data

Mar. 12, 2007 (EP) .................................... 07103915

(51) Int. Cl.
*G06K 15/00* (2006.01)
(52) U.S. Cl. ................ 358/1.16; 358/1.1; 711/115
(58) Field of Classification Search ............ 358/1.1, 358/1.16; 711/115
See application file for complete search history.

(56) References Cited

U.S. PATENT DOCUMENTS

| | | | |
|---|---|---|---|
| 7,383,386 B1* | 6/2008 | Iyer et al. ............... | 711/115 |
| 2003/0005190 A1* | 1/2003 | Leete .................... | 710/52 |
| 2004/0246503 A1* | 12/2004 | Silverbrook .............. | 358/1.1 |
| 2005/0190399 A1* | 9/2005 | Nakaoka et al. ........... | 358/1.15 |
| 2006/0039033 A1 | 2/2006 | French et al. | |
| 2006/0268310 A1 | 11/2006 | Tamai et al. | |
| 2007/0098161 A1* | 5/2007 | Ibrahim et al. .......... | 380/55 |
| 2007/0146766 A1* | 6/2007 | Murakami .............. | 358/1.14 |

OTHER PUBLICATIONS

OCE: "Oce Print From Pocket Mailbox" OCE VarioPrint, [Online] Feb. 16, 2007, XP002444695.
Sony, Electronics, Inc.: "User's Guide to Creating PDFs for the Sony Reader" [Online] Feb. 16, 2007, XP002444696.

* cited by examiner

*Primary Examiner* — Benny Q Tieu
*Assistant Examiner* — Martin Mushambo
(74) *Attorney, Agent, or Firm* — Birch, Stewart, Kolasch & Birch, LLP (57) ABSTRACT

A computer-connectable portable memory device is specifically adapted for storing digital data files for the purpose of transferring the files to other equipment and/or displaying the files. The device has program code permanently residing therein and causing the device to identify itself as a printer when connected to a multi-purpose computer.

12 Claims, 5 Drawing Sheets

COMPUTER-CONNECTABLE PORTABLE MEMORY DEVICE

CROSS-REFERENCE TO RELATED APPLICATIONS

This nonprovisional application claims priority under 35 U.S.C. §119(a) on Patent Application No. 07103915.0, filed in the European Patent Office on Mar. 12, 2007, the entirety of which is incorporated herein by reference.

BACKGROUND OF THE INVENTION

1. Field of the Invention

The present invention relates to a computer-connectable portable memory device that is specifically adapted for storing digital data files for the purpose of transferring the files to other equipment and/or displaying the files.

2. Description of Background Art

As an example of such a device, a memory stick, such as a USB stick, may be considered. As is known in the art, a USB stick may be physically connected to a computer, e.g. a personal computer, a laptop or the like, by plugging the same into a USB socket of the computer. When the stick is plugged in, this triggers a short log-on procedure wherein the computer detects and identifies the device that has been connected. To that end, the stick has permanently stored therein, e.g. on a ROM, a data item that identifies the type of the device. By reading the data item, the computer will recognize the type of device and will enter it into a list of connected devices. Other computer-connectable devices such as an external disk drive, a digital camera, a printer and the like are identified in a similar way. In case of a memory stick, the computer will identify the device as a mass storage device, and, typically, an icon representing that device will be displayed on a desktop screen of the computer. Then, a user may upload data files to the stick by means of drag-and-drop or by means of a save command, in the same manner as files are usually saved on an internal volume or folder on the computer.

When the device is to be disconnected from the computer, it is common to enter an eject command before the device is physically disconnected. This makes sure that the device is logically disconnected from the computer in a defined manner. When the device is disconnected, the device is removed from the list of connected devices and its icon disappears from the desktop screen.

Then, the memory stick may for example be plugged into another computer on which the files may then be downloaded. Thus, the memory stick is a useful tool for transferring digital files between computers that are not connected to a common network.

In a publication of the applicant: Océ VarioPrint® 1055/1065/1075/2062/2075 "Océ Scan to Pocket Mailbox" and "Océ Print From Pocket Mailbox" (http://www.oceusa.com/main/view_media.jsp?CONTENT%3C%3Ecnt_id=10134198673371922&FOLDER%3C%3Efolder_id9852723696639482bmUID=1168357549484&content_path=/media/Assets/PDFs/TSS/externalVP1000/Documentation/VP1055_QRS_IC_GB.pdf; 16.02.2007), a multifunctional printing, scanning and copying device (MFD) has been disclosed, which is equipped with a USB port, so that a USB stick of the type described above may be plugged into the MFD which will then treat the memory stick as a user mailbox from which the files stored on the stick may be printed. In this way, the storage device may be used for printing documents that have been stored or created on the computer. Thus, the storage device may be used as a tool for printing documents without having to connect the computer and the printer to a network, which will also circumvent many problems related to firewalls, access rules and the like. When the storage device is connected to the printer, the mailbox function may be used for interactively printing selected ones of the data files that are stored on the device. In a more straightforward approach, the printer might just interpret the data stored on the device as a print job and print them all when a print button of the printer has been pressed.

In these cases; however, the data files to be printed must of course be stored on the memory stick in a printable format such as PDF, PostScript or PCL. Consequently, the user will have to convert the files into a printable format on his computer before he uploads the files onto the memory stick. This may for example be achieved by means of a "print to file" function that is frequently implemented in application software for computers. Thus, in order to store a file on the memory stick to print the same, the user may open the file with a suitable application software on his computer, enter a print command and select the option "print to file." Then, after clicking the print button, the user will be prompted to designate a target volume where the file is to be saved, and he may then designate the memory stick as the target volume.

Other examples of portable storage devices to which the present invention is applicable comprise palmtop computers, PDAs, smart phones, e-paper devices and the like. These devices may also be connected to a PC or laptop and possibly a printer by means of a USB connection or any other suitable wireline or wireless connection, e.g. Bluetooth, WLAN or the like. Some of these devices will have a display function for displaying the contents of the files that have been stored thereon. This is particularly the case for an e-paper device that is specifically designated to that purpose. In these cases; however, the files should have a format that suitably matches the specifications of the display of the portable device, especially the screen size, display resolution and the like.

The document "User's Guide to Creating PDFs for the Sony® Reader," published by Sony Electronics, Inc. (http://download.oreilly.com/make/PDFsforSONYreader.pdf; 16.02.2007) discloses a procedure for creating, on a personal computer, data files that are suitable for being displayed on the e-paper device (the reader). This procedure requires the user to make a number of suitable settings for adapting the file format to the specifications of the reader.

U.S. Application Publication No. 2005/190399 A1 describes a memory device that has the form of a USB stick, which has permanently stored thereon an identification of a printer as well as printer driver for that printer. When the stick is plugged into the computer, it identifies itself as a USB device, and an auto run function automatically installs the printer driver. Documents to be printed will then be converted into a printable format in accordance with printer specifications included in the permanent memory on the stick, and the print file will be stored in the mass memory of the stick. When the USB device is disconnected from the computer, the printer driver will automatically be uninstalled again. Finally, when the stick is plugged into the specified printer, the print file may be printed.

SUMMARY OF THE INVENTION

It is an object of the present invention to provide a portable storage device that is particularly suited for the purpose of printing and/or displaying digital data files and is easy to handle even for an inexperienced user.

In order to achieve this object, the program code causes the device to identify itself as a printer that is adapted to be driven by a printer driver that may permanently be installed on the multi-purpose computer.

Thus, when the device according to the present invention is connected to a computer such as a PC or a laptop, the computer will recognize the device as a printer of a specific type, not as a mass storage device. Then, when a printer driver that is compatible with that specific type of printer is already installed on the computer, the computer will enter the device into its list of connected printers. When this "printer" is selected for printing, the storage device will interact with the printer driver in the same manner as a true printer would do, with the only difference being that the files are not really printed but are just stored on the device in a printable format.

Consequently, when a user runs a software application on his computer and wants to print a document from this application, but the computer is not connected to any real printer (e.g. when the computer is a laptop that is used during a travel on a train), the user may simply enter the print command in the software application, and then select the storage device as the "printer" in the print dialogue of the software application and click the print button, with the result that the file will automatically be converted into the printable format and stored on the memory device. Thus, from the view point of the user, the procedure is identical with a normal print operation, and the user is relieved from the burden of using the "print to file" option and designating a target volume. Further, this procedure can be applied even when no "print to file" option is available.

Similarly, when the memory device is an e-paper device, and the user wants to upload a document to that device, he may simply use the normal print function and will not have to bother with any settings for converting the document into a suitable display format. In other words, the procedure of converting the file to the display format and designation of the target volume are replaced by the simple step of entering a print command, with suitable selection of the printer.

With regard to the selection of the printer, it should be noted that most commercial application software, such as text processing software and the like, will store the printer that has been used earlier in the same application as the default printer, so that, when a subsequent document is to be uploaded to the memory device, the correct printer has been selected already and the procedure just consists of entering the print command.

In the above description of the most general features of the present invention, it has been assumed that the suitable printer driver has already been installed on the computer, so that the device according to the present invention can only be used after the computer has been prepared therefor by installing the suitable printer driver. In a preferred embodiment of the present invention; however, the printer driver software is included on the memory device itself, and the device is configured to automatically install the printer driver when the device is connected to the computer. Of course, this installation step may be skipped when it is detected that the driver has been installed already.

As another useful option, the memory device may be configured to define itself as the default printer in the log-on procedure. Then, when the memory device has been connected to the computer, all software applications on the computer will automatically print to the memory device unless the user selects another printer. Even more preferably, the device is configured to store the identity of the printer that was used as a default printer before the device was connected, and to re-establish the former default printer in the log-off procedure when the memory device is ejected.

When the memory device according to the present invention is actually to be used for printing purposes, then, of course, the printer driver should be compatible with at least one available printer. This implies at least that the printable format to which the files are converted is a format that can be printed on the real printer. Further, the printer should be capable of appropriately interacting with the memory device when this device is connected to the printer. For this reason, the present invention also includes a combination of the memory device with a printer that is adapted to co-operate with that device. In a particularly preferred embodiment, the memory device may be offered as an accessory to the printer.

Although the memory device identifies itself as a printer when connected to a multi-purpose computer, the real printer should recognize this device as a memory device from which the print files can be downloaded. To this end, the printer may be configured to ignore the identification of the memory device as a printer. As an alternative, the memory device may be configured to detect whether it is connected to a multi-purpose computer or to a printer and to identify itself as a printer only when connected to the computer.

In a preferred embodiment, the memory device is configured to identify itself as both, the printer and a mass storage device (or a PDA, if the device is a PDA, and so on). Then, when the device is connected to the computer, it will be listed not only as a printer but also as a mass storage device, and a corresponding volume icon will appear on the desktop screen of the computer, so that the device may also be used for storing normal files, that need not be in a printable format, by means of a usual save operation or a drag-and-drop. Then, the memory device may provide two different storage areas, one for print files and one for other user documents. The ratio of the sizes of these two storage areas may be variable in accordance with the demand. This may simply be achieved by distinguishing the different types of files from one another by suitable extensions of the file names. Then, when the memory device is connected to the printer, the printer will "see" all the files that are stored on the device, and it will identify the print files by their file extension and will treat these files as a print queue or a user mailbox.

In view of the print application and, especially, the printer mailbox function, it is preferable when the memory device is also capable of permanently storing personal data of the user, e.g. the user name, another identification or authentication token of the user, a password and the like, so that the device may be personalized for a specific user. The personal data may be entered in the course of an initializing routine, which may, for example, be called up automatically when the device is connected to a computer on which the printer driver has not yet been installed. Thus, the initializing routine may be integrated with the routine for installing the printer driver on the computer.

When the device is connected to a printer having a mailbox function, the user identification may be used for identifying the mailbox, so that the user may select his mailbox on an operating panel of the printer. Then, the user may also choose to copy his mailbox from the memory device to a local memory of the printer. Further, the user identification may be used for accounting purposes in order to check whether the user is authorized to use the printer and to charge the user for the prints that he makes on the printer. In a more elaborate embodiment, the memory device may also be configured to store and manage a prepaid account of the user.

A password may be stored for preventing others from getting access to the mailbox, if the memory device is lost. When the mailbox on the memory device is protected by a password, the associated printer, another PC or any other element connected to the device will open the mailbox only after the user has entered the password, e.g. on the operating panel of the printer.

Further, the printer driver may include an option to encrypt the print files, preferably by means of an encryption code that is constructed in accordance with a specific algorithm from the password. Then, when the correct password is entered at the printer, the printer will decrypt the print files with a corresponding decryption code that is constructed from the password by a corresponding algorithm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described in detail with reference to the accompanying drawings, wherein the same reference numerals will be used to identify the same or similar elements throughout the several views.

Figure 1:
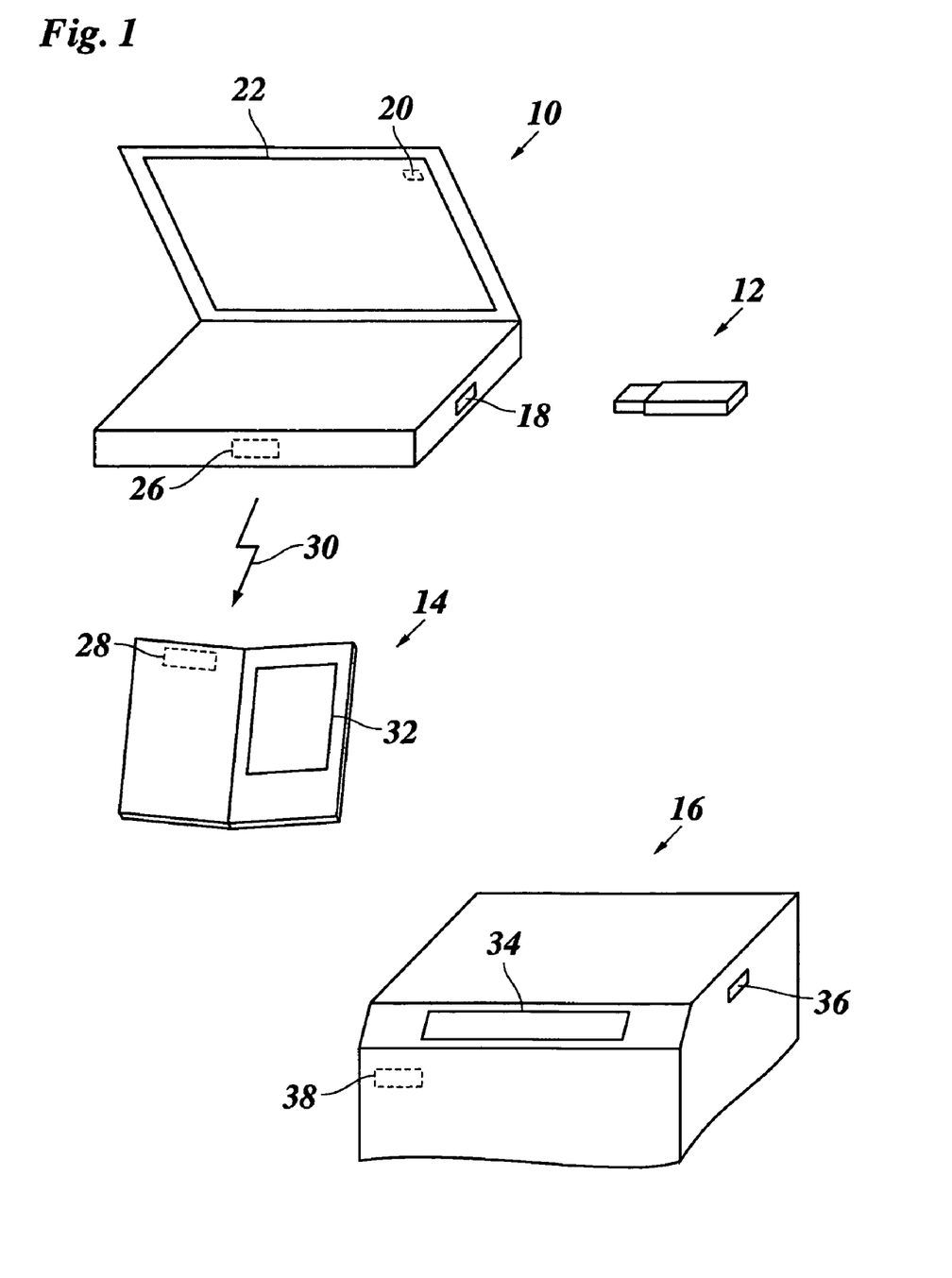
FIG. 1 is a schematic view of a set of devices that are adapted to co-operate with one another in the framework of the present invention.

FIG. 1 shows a laptop 10 as an example of a multi-purpose computer, a memory stick 12, an e-paper device 14 and a printer 16.

The laptop 10 has a USB socket 18 where the memory stick 12 may be plugged in. When the memory stick is connected to the laptop 10 in this way, the computer reads data that is permanently stored on the memory stick and, on the basis of this data, the stick is recognized as a printer. In the example shown, the memory stick 12 is also recognised as a mass storage device, in addition to being recognized as a printer, and an icon 20 for a mass storage device appears on a desktop screen 22 of the laptop.

The laptop 10 and the e-paper device 14 have respective interfaces, e.g. bluetooth interfaces, for establishing a wireless connection 30 therebetween. The e-paper device 14 has a display screen 32 for displaying documents that have been uploaded to the device in a suitable display format.

The printer 16 may, for example, be a multifunctional device (MFD) for printing, scanning and copying, and has an operating panel 34 where a local user may enter control commands for the various print, scan, and copy functions. In addition, in this example, the printer 16 is equipped with a USB socket 36 and a bluetooth interface 38, so that it may communicate and interact with both, the memory stick 12 and the e-paper device 14.

When the bluetooth connection 30 between the laptop 10 and the e-paper device 14 is established, suitable software that resides permanently in a memory of the e-paper device 14 will assure that the laptop 10 recognizes the e-paper device as a specific type of printer. The memory stick 12 and the e-paper device 14 will generally identify themselves as different types of printers but might also identify themselves as printers of the same type.

Figure 2:
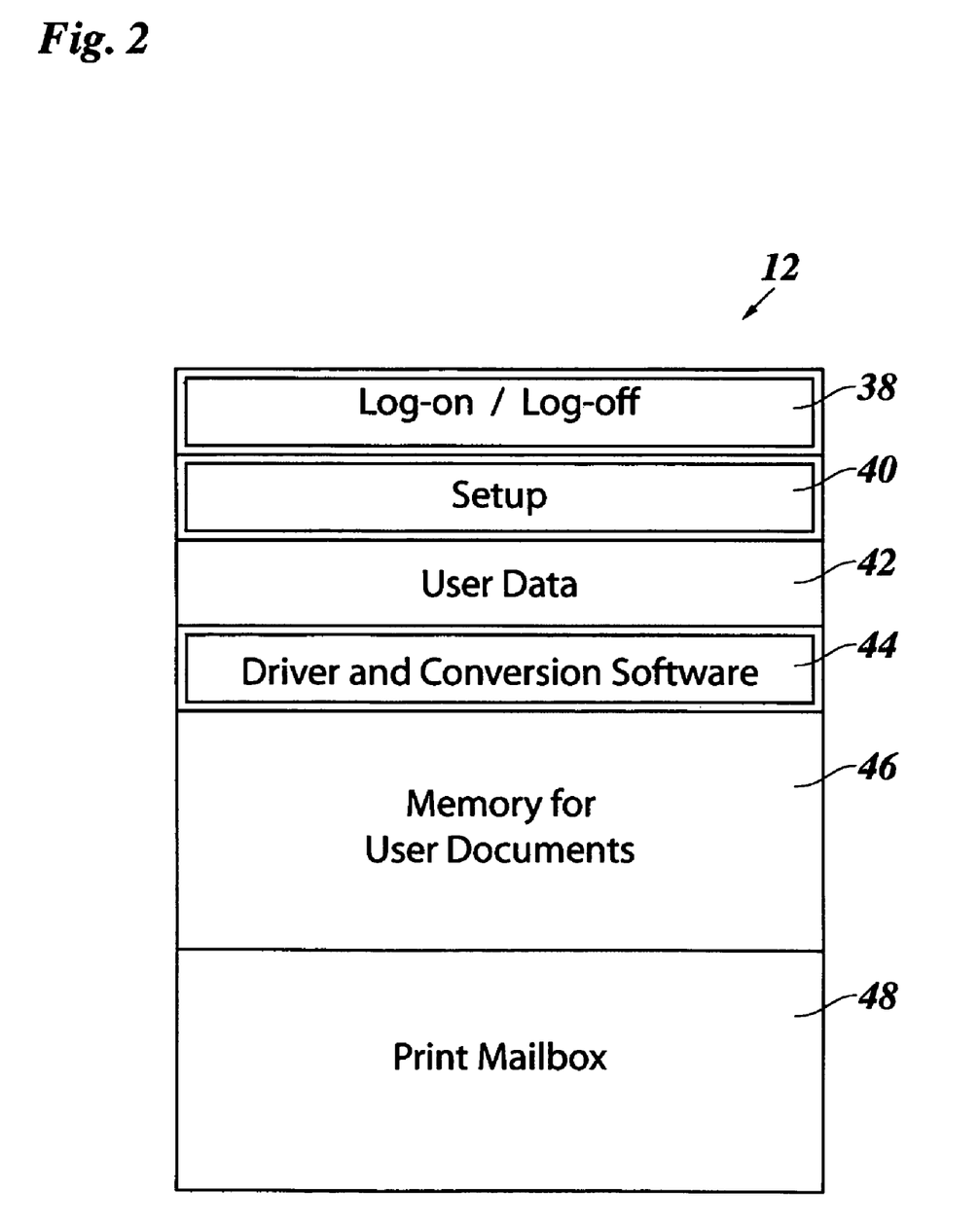
FIG. 2 is an example of a data structure of a memory stick according to the present invention.

FIG. 2 shows a data structure of the memory stick 12, which permits this memory stick to act as a memory device according to the present invention. The memory stick 12 comprises a read only memory (ROM) that is represented in FIG. 2 by boxes with a double frame, and a random access memory (RAM) that is represented by boxes with a single frame. The ROM contains data that are programmed during production of the memory stick and remain permanently on the stick, whereas the RAM contains data that may be changed by a user.

The ROM contains a data block 38 with data and/or program code for a log on procedure. This data is read by the laptop 10 when the memory stick is connected thereto and permits identification of the memory stick as a specific type of printer. In the example shown, the data block 38 also contains data and/or program code for a log off procedure that is performed when the memory stick is to be disconnected from the computer.

The ROM further includes a data block 40 for a set-up procedure that is performed when the memory stick is connected to the laptop 10 for the first time. Among other things, the set-up procedure permits a user to personalize the memory stick by entering user specific data that will be stored in a data block 42 of the RAM. It will be understood that the program code for the set-up procedure will be read and executed by the processor of the laptop, when the memory stick is connected thereto.

The ROM further includes a data block 44 that contains driver software, i.e. program code for a printer driver that may be installed on the laptop 10 (e.g. in the set-up procedure). The printer driver in the data block 44 corresponds to the specific type of printer that the memory stick identifies itself as to the laptop 10. This driver software includes conversion software for converting data files into a printable format such as PDF, PostScript or PCL.

The main part of the RAM is reserved for storing user files. For illustration purposes, this part of the RAM has been shown as being separated into a memory space 46 where the user may store data files of any format, and a memory space 48 for storing data files that have been converted into the printable format. Thus, the memory space 46 permits use of the memory stick 12 as a conventional mass storage device, whereas the memory space 48 permits the user to use the memory stick 12 as a print mailbox from which the print files can be called up when the stick has been connected to the printer 16.

Figure 3:
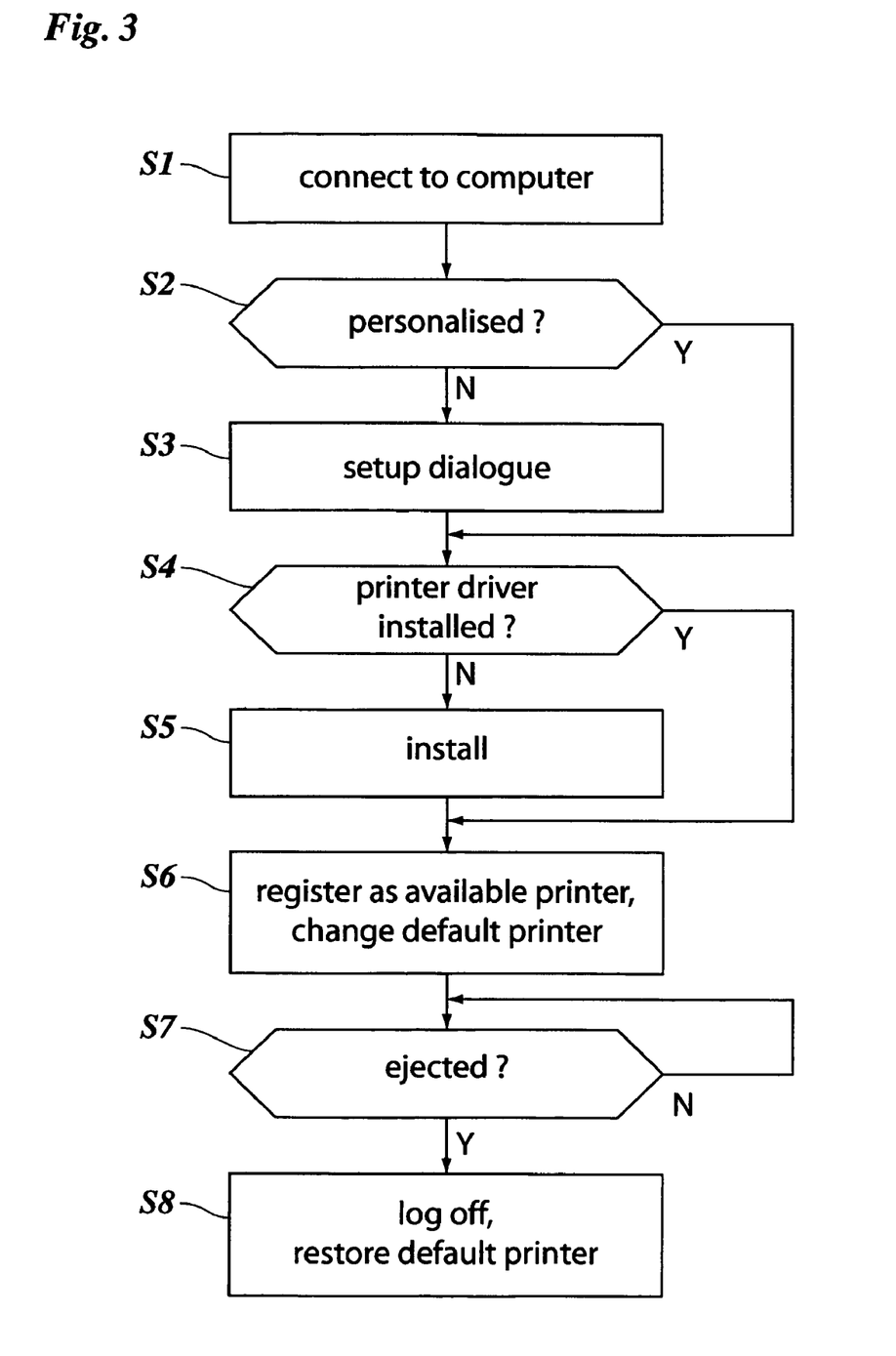
FIG. 3 is a flow diagram of a procedure that is carried out when a device according to the present invention is connected to and disconnected from a computer.

FIG. 3 illustrates the main steps that are performed when the memory stick 12 is connected to the laptop 10 and disconnected therefrom.

In step S1, the memory stick is plugged into the USB socket 18 of the laptop 10, and the log-on data in the ROM assures that the laptop will recognize the memory stick as a specific type of printer. Further, the processor of the laptop reads program code from the ROM of the memory stick and executes this code to perform the subsequent steps.

In step S2, the laptop processor reads the user data from data block 42 to decide whether the memory stick 12 has been personalized already, i.e. whether the user name and/or another identification or authentication token has been stored in the data block 42. If this is not the case, a set-up dialogue (step S3) appears on the screen of the laptop and invites the user to enter his personal data. These data are then stored in the data block 42. Further, the user name may be added to a device name in the icon 20 on the desktop screen, so that the name of the device may then read for example: "pocket mailbox of <user name >." If the stick had been personalized already, the step S3 will be skipped.

Then, it is checked in step S4 whether a printer driver for the specific type of printer, that the memory stick 12 has identified itself as, has been installed already on the hard disk of the laptop 10. If this is not the case, the printer driver is installed in step S5. Otherwise, step S5 is skipped.

In step S6, the laptop processor lists the memory stick 10 as a connected printer that will be available for printing. Further, in this example, the memory stick 12 is selected as the default printer. Thus, unless the user actively selects another printer, a print command entered from any application software will cause the corresponding file to be "printed" to the memory stick 12.

When the user wants to disconnect the memory stick 12 from the laptop, he may select (activate) the icon 20 and enter an "eject" command. This will be detected in step S7 and will trigger a log-off procedure (step S7) in which the printer (memory stick 12) is removed from the list of available printers, the icon 20 is cancelled and the previous default printer, the one that had been defined as the default printer prior to step S6, is restored. As a consequence, any future print commands will automatically be directed to the printer (if present) that is normally utilized by the user.

Figure 4:
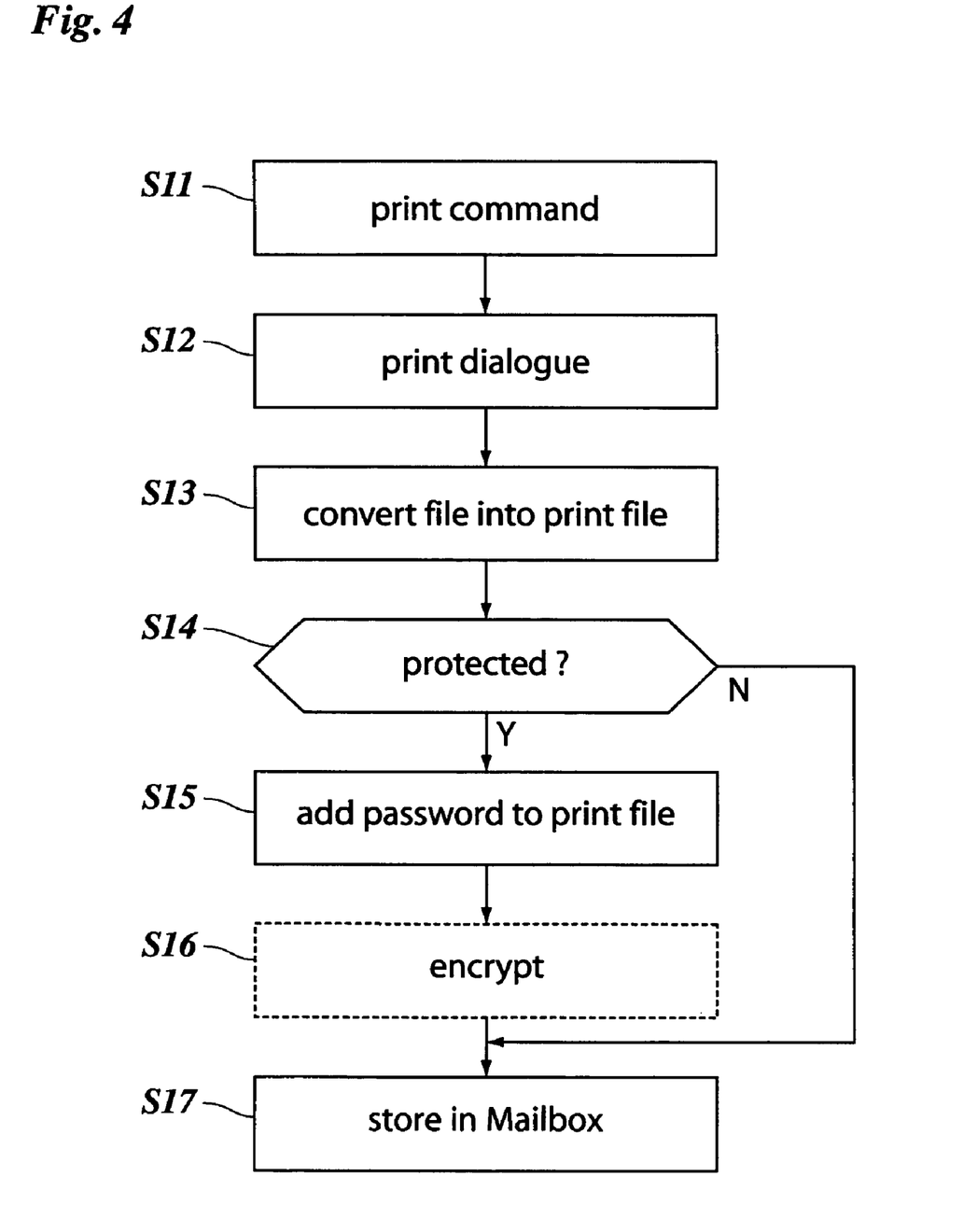
FIG. 4 is a flow diagram of a procedure for storing a print file on the memory device.

FIG. 4 illustrates a procedure for "printing" onto the memory stick 12 in the condition that is found during the time between the steps S6 and S7 in FIG. 3. It is assumed that the user has opened a document with a software application, e.g. a text processing program that supports a print command.

The print command is entered in step S11 and triggers a print dialogue (step S12) as usual. Since the memory stick 12 has been set as the default printer, the print dialogue will indicate that this "printer" is going to be used. If the user does not change the printer, but simply clicks the "print" button in the dialogue, the printer driver (that has been installed in step S5) will convert the document into a printable file (step S13).

The print dialogue (step S12) may offer an option to protect the print file by entering a password. This is checked in step S14, and when a password has been entered, this password is added to the print file in step S15. Optionally, if a password had been entered for the memory stick as a whole in the set-up dialogue in step S3, then this password may be used as a default.

Optionally, depending on the settings made by the user in the print dialogue, the print file may be encrypted and marked as an encrypted file in step S16. Finally, the print file (converted into the printable format, with or without a password and with or without being encrypted) will automatically be stored in the memory space 48 on the memory stick (step S17).

It will be appreciated that the procedure described above is very convenient and transparent, even for an inexperienced user, since it is identical to the procedure for a "normal" print command, except for the options that are additionally offered for protecting the file.

In this way, the user may store a plurality of print files on the memory stick. When the stick has been disconnected from the computer and has been plugged into the USB socket 36 of the printer 16, the printer will recognize the memory stick (only) as a mass storage device and will treat the memory space 48 as a mailbox. In order to print the files, the user may indicate on the operating panel 34 that he wants to print from the mailbox, and, possibly after having entered his password, he may open his mailbox, and the files contained therein will be listed on a display on the operating panel 34. The user may then select one or more of these files and press the print button in order to have the files printed.

The e-paper device 14 shown in FIG. 1 is another example of a memory device according to the invention. A possible data structure for this device, analogous to the data structure shown in FIG. 2, has been illustrated in FIG. 5. In this example, it is assumed for simplicity that the device 14 shall not be used for having files printed on the printer 16 but shall only be used for viewing the documents represented by these files on the display screen 32.

Figure 5:
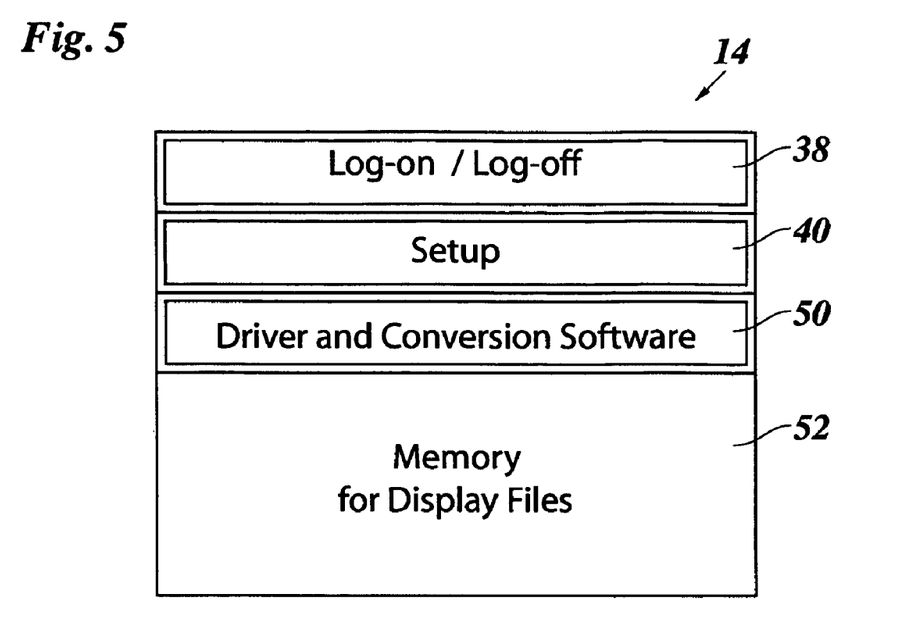
FIG. 5 is an example of a data structure for an e-paper device according to the present invention.

The data blocks 38 and 40 in FIG. 5 are equivalent to the ones described in conjunction with FIG. 2. The option to personalize the device has been omitted in this example.

A data block 50 in FIG. 5 corresponds to the data block 44 in FIG. 2, but in this case the conversion software will not necessarily convert the documents into a printable format, but rather into a format that is suitable for being displayed on the screen 32. This conversion will include an adaptation of the image size to the dimensions of the screen 32, and a suitable adaptation of the image resolution to the resolution of the display screen. The RAM of the device 14 simply consists of a memory space 52 for the files that have been converted into the display format.

Figure 6:
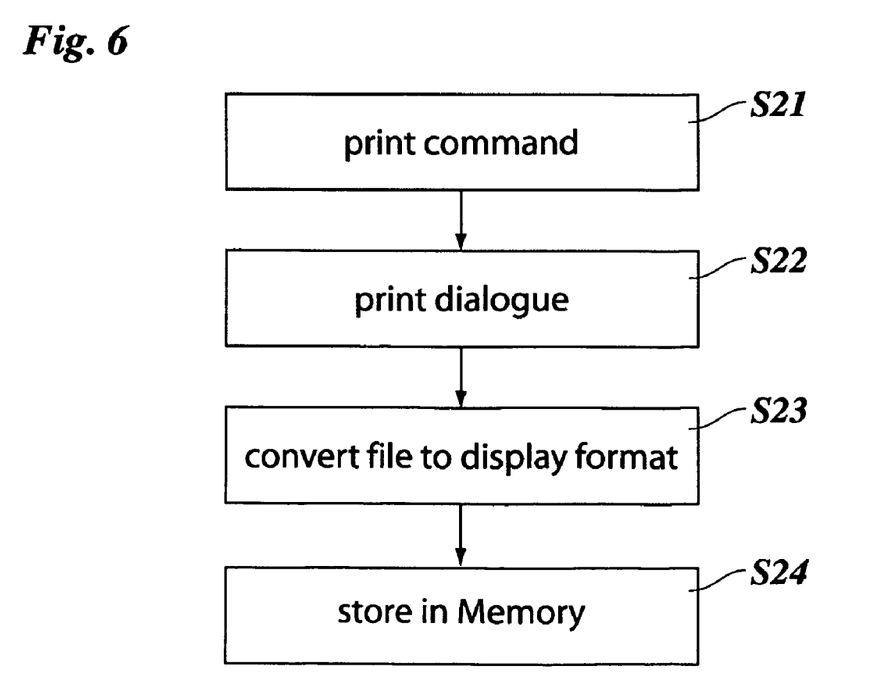
FIG. 6 is a flow diagram of a procedure for storing a file on the e-paper device.

FIG. 6 illustrates a procedure for "printing" a document to the e-paper device 14. Again, it is assumed that a document has been opened with an application software on the laptop 10 and the user has entered the print command in step S21. Further, it is assumed that the driver and conversion software for the device 14 has been installed on the laptop 14 beforehand, by means of a procedure analogous to what has been described in conjunction with FIG. 3.

Then, in step S22, a print dialogue will open, and the e-paper device 14 will already be set as the default printer. Thus, the user simply has to confirm the print command by clicking into the print button in the dialogue. The driver and conversion software will then automatically convert the document into the display format in step S23 and store the converted file in the memory space 52 in step S24.

Optionally, although not shown in the drawing, the device 14 may also be configured to be useable as a "normal" mass storage device, as has been described above for the memory stick 12.

If the display format to which the files are converted in step S23 is at the same time a printable format, then it will also be possible to establish a bluetooth connection between the device 14 and the printer 16 and to have the files printed on the printer 16.

In a modified embodiment (not shown), the device 14 may also be configured to offer a possibility to store documents in both, a display format and a printable format, i.e. each document will be converted into two files that will be distinguished by the extension of their file name and/or are stored in separate memory spaces of the RAM of the device 14. As another alternative, the print dialogue may offer a selection of whether the user wants to store the document as a display file or as a print file, preferably with the option "display file" as a default setting.

The option to use the device 14 not only for viewing documents but also for having them printed on a printer may be attractive, for example, in a situation where the user wants to travel to a conference to hold a speech. He may then print his manuscript to the lightweight and portable device 14 and may use the device for reading the manuscript in order to prepare for the speech while he is on his way. Then, when he has arrived at the conference location, he may connect to a printer and have the manuscript printed as hand-outs for the audience.

While only a memory stick and an e-paper device have been described here as illustrations of a memory device according to the present invention, it will be understood that the invention may also be applied to other types of memory devices such as smart phones, PDAs and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A computer-connectable portable memory device that is adapted for storing digital data files for the purpose of transferring the files to other equipment and/or displaying the files, comprising:
   a first data block, the first data block having program code, said program code causing the portable memory device to identify the portable memory device, when connected to a computer, as a printer being adapted to be driven by a printer driver; and
   a second data block having the printer driver,
   wherein the memory device comprises non-volatile memory.

2. The portable memory device according to claim 1, wherein the portable memory device is a memory stick.

3. The portable memory device according to claim 1, wherein the portable memory device is an e-paper device having a display screen for displaying the files.

4. The portable memory device according to claim 1, further comprising program code that is readable by the computer when the portable memory device is connected thereto and, when run on the computer, operates as a printer driver that converts the files into a predetermined format and stores the converted files on the portable memory device.

5. The portable memory device according to claim 4, further comprising program code that is readable by the computer and, when run on the computer, causes the computer to read the printer driver program code from the portable memory device and to install the printer driver program code on the computer.

6. The portable memory device according to claim 4, in combination with a printer, wherein said predetermined format is a printable format, the portable memory device is connectable to the printer, and the printer is configured to recognize the portable memory device as a mass storage device, to read the files in the predetermined format therefrom and to print the files.

7. The portable memory device according to claim 6, wherein the printer is configured to treat the portable memory device as a mailbox, when the portable memory device is connected to the printer, and to permit a user to select files to be printed from the mailbox.

8. The portable memory device according to claim 6, wherein the portable memory device is adapted to store an authentication token of a user, and the printer is adapted to read the authentication token and to print files from the mailbox only when the user is recognized as an authenticated user, by reference to the authentication token.

9. The portable memory device according to claim 7, wherein the portable memory device is adapted to store an authentication token of a user, and the printer is adapted to read the authentication token and to print files from the mailbox only when the user is recognized as an authenticated user, by reference to the authentication token.

10. The portable memory device according to claim 1, further comprising program code that is readable by the computer and, when run on the computer, causes the computer to execute a set-up procedure for personalizing the portable memory device by storing personal data of the user on the portable memory device.

11. The portable memory device according to claim 1, wherein the program code that causes the device to identify itself as a printer is configured to indicate to the computer that the device is also operable as a mass storage device for storing digital data files in any format.

12. The portable memory device according to claim 1, further comprising a third data block, the third data block being random access memory for storing files.

* * * * *